United States Patent
Raghavan et al.

(10) Patent No.: US 9,792,245 B2
(45) Date of Patent: Oct. 17, 2017

(54) PERIPHERAL COMPONENT INTERCONNECT EXPRESS (PCIE) DEVICES WITH EFFICIENT MEMORY MAPPING BY REMAPPING A PLURALITY OF BASE ADDRESS REGISTERS (BARS)

(71) Applicant: Avago Technologies General IP (Singapore) Pte. Ltd, Singapore (SG)

(72) Inventors: Ramprasad Raghavan, Colorado Springs, CO (US); Eugene Saghi, Colorado Springs, CO (US)

(73) Assignee: AVAGO TECHNOLOGIES GENERAL IP (SINGAPORE) PTE. LTD., Singapore (SG)

(*) Notice: Subject to any disclaimer, the term of this patent is extended or adjusted under 35 U.S.C. 154(b) by 384 days.

(21) Appl. No.: 14/564,633

(22) Filed: Dec. 9, 2014

(65) Prior Publication Data
US 2016/0162436 A1 Jun. 9, 2016

(51) Int. Cl.
G06F 13/42 (2006.01)
G06F 13/28 (2006.01)

(52) U.S. Cl.
CPC .......... G06F 13/4282 (2013.01); G06F 13/28 (2013.01)

(58) Field of Classification Search
CPC ......... G06F 3/00; G06F 13/4282; G06F 13/28
See application file for complete search history.

(56) References Cited

U.S. PATENT DOCUMENTS

| 7,694,025 | B1* | 4/2010 | Norrie | G06F 3/00 710/3 |
| 7,865,588 | B2 | 1/2011 | Hayden et al. | |
| 8,645,594 | B2* | 2/2014 | Foong | G06F 12/063 710/31 |
| 9,032,102 | B2* | 5/2015 | Granovsky | G06F 13/36 710/3 |
| 9,268,717 | B2* | 2/2016 | Kanigicherla | G06F 13/10 |
| 9,329,783 | B2* | 5/2016 | He | G06F 3/0655 |
| 2009/0248973 | A1* | 10/2009 | Deshpande | G06F 13/4226 711/108 |

(Continued)

OTHER PUBLICATIONS

Down to the TLP: How PCI Express Devices Talk (Part I), Xillybus, Nov. 12, 2014.

(Continued)

*Primary Examiner* — Tammara Peyton
(74) *Attorney, Agent, or Firm* — Sheridan Ross P.C.

(57) ABSTRACT

Embodiments herein provide for efficient memory mapping in a PCIe device when a host changes memory allocations in the device. One PCIe device comprises a plurality of Base Address Registers (BARs) defined by the host. The device also includes a processor with an address space. The processor maps addresses of the address space to the BARs for routing PCIe packets from the host. The processor can determine that the host is reconfiguring the BARs, and, based on the determination, mark packets existing in the computer memory as old, change the BARs in the computer memory as directed by the host, mark packets received after the BAR change as new, process the old packets from the computer memory based on their addresses of the address space until a new packet is reached, and to remap the BARs to the addresses of the address space after the new packet is reached.

20 Claims, 6 Drawing Sheets

(56) References Cited

U.S. PATENT DOCUMENTS

2015/0169331 A1* 6/2015 Nelogal ............. G06F 13/4022
710/108

OTHER PUBLICATIONS

Utilizing Extra FC Credits for PCI Express Inbound Posted Memory Write Transactions in Powerquicc III Devices, Freescale Semiconductor, Document An3781, Rev. 0, Jun. 2009.

* cited by examiner

PERIPHERAL COMPONENT INTERCONNECT EXPRESS (PCIE) DEVICES WITH EFFICIENT MEMORY MAPPING BY REMAPPING A PLURALITY OF BASE ADDRESS REGISTERS (BARS)

FIELD OF THE INVENTION

The invention generally relates to Peripheral Component Interconnect Express (PCIe) devices and the manner in which they process PCIe packets.

BACKGROUND

PCIe is a high-speed serial computer expansion bus standard and protocol that can be used as a data interface to various types of devices, such as memory cards and solid state drives (SSDs). In PCIe, a host system establishes memory regions in attached PCIe devices to control routing of PCIe packets generated by applications running on the host system. The memory regions are defined by Base Address Registers (BARs) in the attached PCIe devices. An attached PCIe device typically provides Processor Inbound Memory (PIM) mapping resources that translate the PCIe memory addresses to local processor addresses of the device to further control routing of received packets within the device. However, routing of the packets can be hindered or even completely corrupted when the host system abruptly changes BARs in the attached PCIe device.

SUMMARY

Systems and methods presented herein provide for efficient memory mapping in a PCIe device when a host system changes memory allocations in the device. In one embodiment, a PCIe device comprises a computer memory with a plurality of Base Address Registers (BARs) defined by the host system. The device also includes a processor with an address space. The processor maps addresses of the address space to the BARs for routing PCIe packets from the host system. The processor can determine that the host system is reconfiguring the BARs, and, based on the determination, mark packets existing in the computer memory as old, change the BARs in the computer memory by reallocating the computer memory as directed by the host system, mark packets received after the BAR change as new, process the old packets from the computer memory based on their addresses of the address space until a new packet is reached, and remap the BARs to the addresses of the address space after the new packet is reached.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
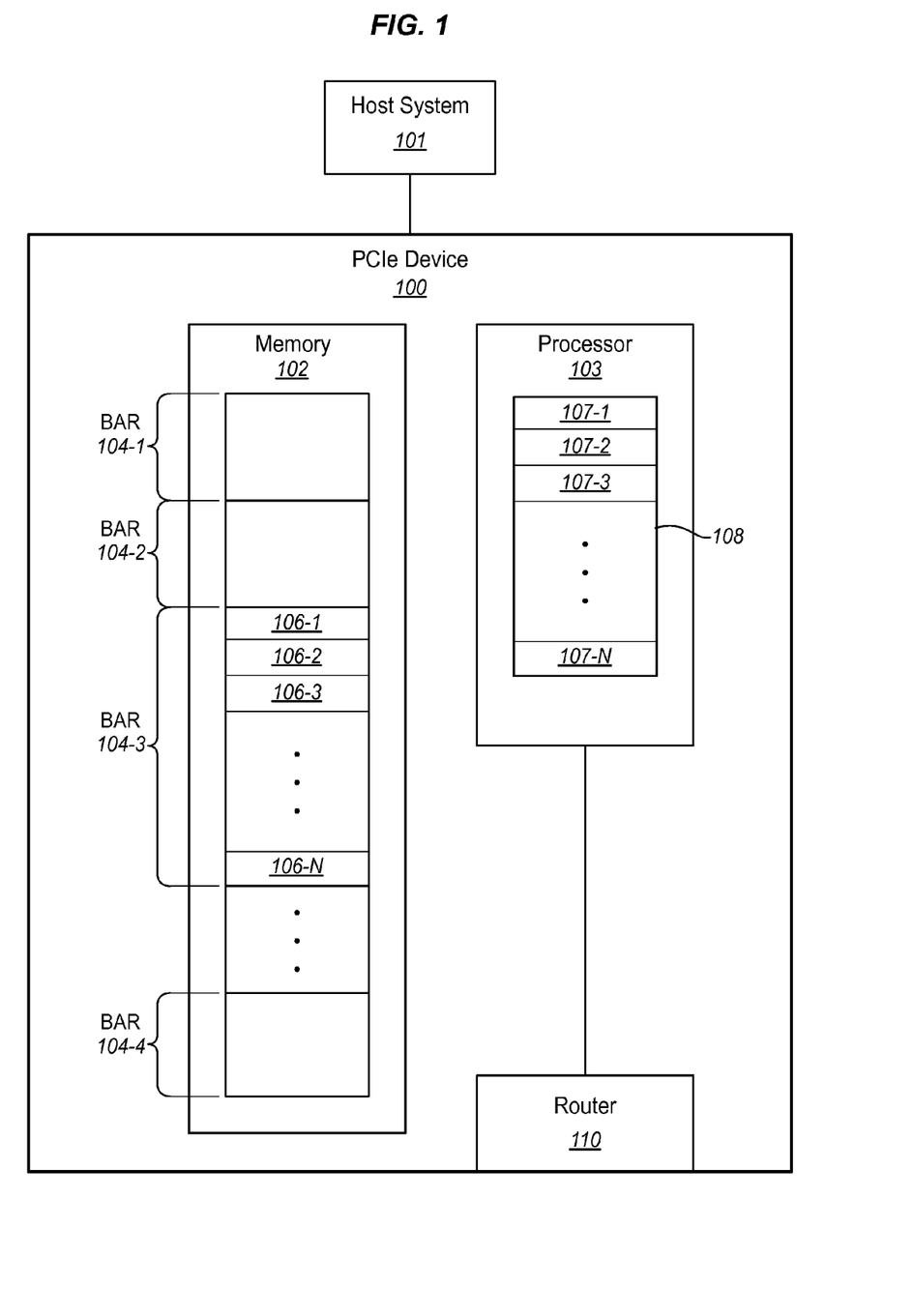
FIG. 1 is a block diagram of an exemplary PCIe device.

FIG. 1 is a block diagram of an exemplary PCIe device 100. The PCIe device 100 disclosed herein is any combination of hardware, software, firmware operable to handle PCIe packets according to the PCIe protocol. The PCIe device 100 includes a local processor 103 configured with an address space 108 (e.g., onboard cache). The PCIe device 100 also includes a memory module 102 (e.g., computer memory such as Dynamic Random Access Memory or "DRAM") communicatively coupled to the processor 103. The address space 108 assists in routing PCIe packets from the host system 101 throughout the PCIe device 100. For example, the host system 101 is operable to route PCIe packets of data through the PCIe device via the memory 102 of the PCIe device 100. The host system 101 is able to do so by essentially taking control of the memory 102 and configuring BARs therein. The PCIe device 100 is then "enabled" by the host system 101 via mapping into the host system's I/O port address space or memory-mapped address space. Firmware of the host system 101 (e.g., the operating system or device drivers) configures the BARs 104 to inform the PCIe device 100 of the host system's address mapping by writing configuration commands to the processor 103. Once the BARs 104 are configured, the processor 103 maps one or more addresses 107 of the address space 108 to individual BARs. Then, the host system 101 can buffer packets in the BARs 104 such that the processor 103 of the PCIe device 100 can route them to their various destinations through the mapped address spaces 107 via a router 110.

To illustrate, the host system 101 has divided the memory 102 into a plurality of BARs 104-1-104-N (wherein the reference "N" is simply intended to represent an integer greater than one and not necessarily equal to any other reference "N" disclosed herein). In this example, the BAR 104-3 is divided into a number of memory locations 106-1-106-N or "regions" where packets can be buffered. The processor 103 allocates a similar number of addresses 107-1-107-N in its address space 108. The processor 103 maps the addresses 107-1-107-N to the memory locations 106-1-106-N. From there, the processor 103 can access the address 107-1 of the address space 108 to retrieve a packet from the host system 101 through the memory location 106-1 of the BAR 104-3 to route it to a specific location based on the addressing of the BAR 104-3. Then, the processor 103 may access the address 107-2 to retrieve a packet from the memory location 106-2, and so on.

As the host system 101 is in control of configuring the BARs 104 within the memory 102, it is possible that the mapping between the addresses 107 of the address space 108 can become misaligned with the memory locations 106 of the BARs 104, resulting in lost packets of data. For example, a host system 101 may have multiple PCIe slots some of which are unused. When another PCIe device is inserted into one of the available PCIe slots of the host system 101, the host system changes the addressing of the PCIe packets and thus changes the BARs 104 of each of the PCIe devices coupled thereto. However, packets may still reside within the BARs 104 as they have not yet been processed by the processor 103. Accordingly, packets may be improperly routed or overwritten by other incoming packets from the host system 101.

The embodiments herein are operable to ensure that packets are correctly mapped to the address space 108 of the processor 103 and that the packets in the memory locations 106 of the BARs are not overwritten in the event of reconfigurations of the BARs 104 of the memory 102 by the host system 101. Additional details regarding one exemplary operation of the PCIe device 100 are now shown and described in FIG. 2.

Figure 2:
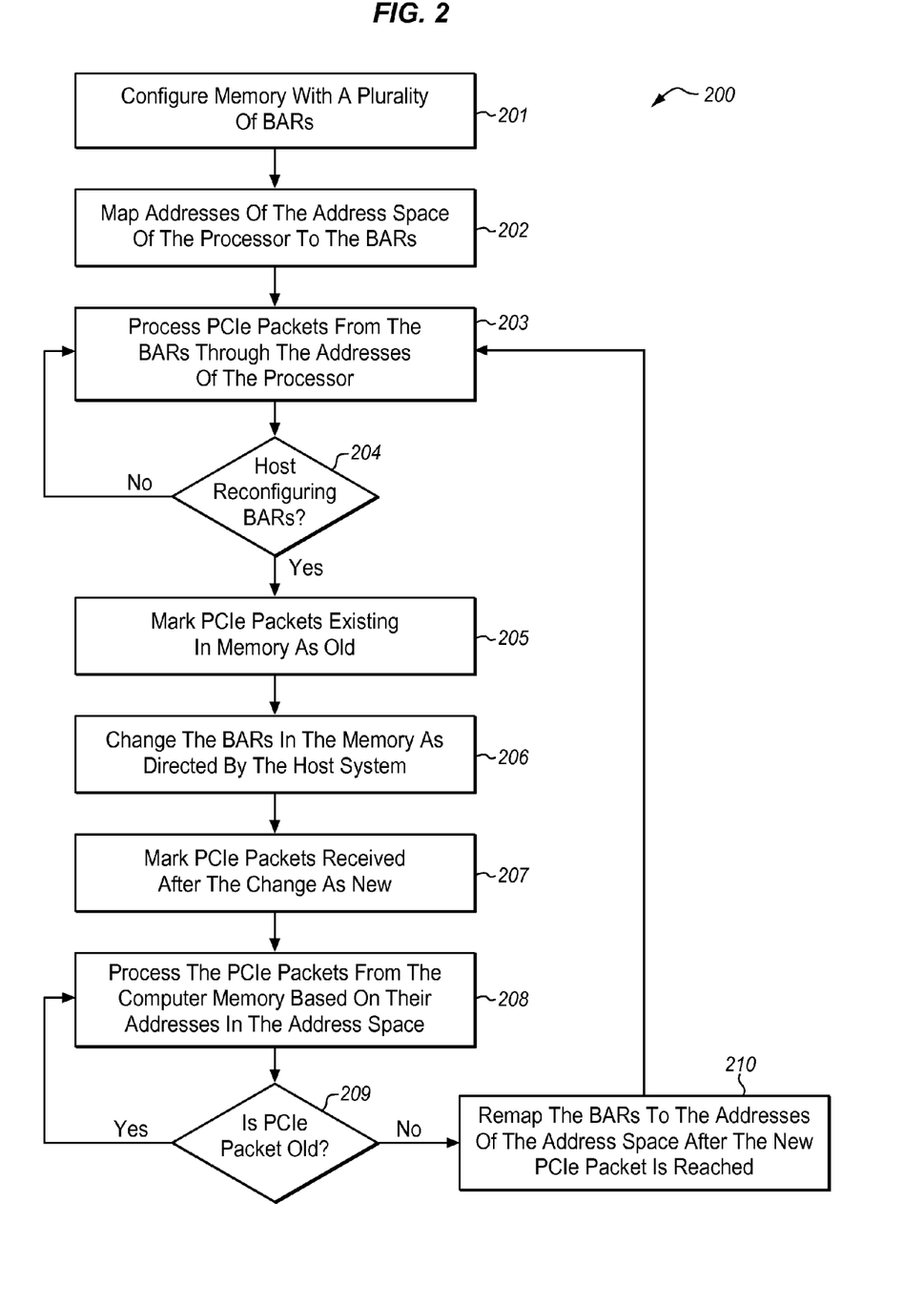
FIG. 2 is a flowchart of an exemplary process of the PCIe device of FIG. 1.

FIG. 2 is a flowchart of an exemplary process 200 of the PCIe device 100 of FIG. 1. In this embodiment, the process 200 initiates with the host system 101 configuring the memory 102 with a plurality of BARs 104, in the process element 201. Then, the processor 103 maps addresses of the address space 108 to the BARs 104, in the process element 202. Now, the PCIe device 100 is operable to process PCIe packets from the host system 101 and does so through the BARs 104 and the addresses 107 of the address space 108 in the processor 103, in the process element 203.

The PCIe device 100 continually monitors the host system 101 to determine whether the host system will be changing BAR 104 configurations in the memory 102, in the process element 204. For example, when the host system 101 needs to change BAR values, the PCIe protocol requires that the host system 101 first send a configuration request to disable the presently configured BARs 104 in the memory 102. Once the host system 101 changes the BAR values, the host system 101 sends a request to the PCIe device 100 to enable the new BAR values via a BAR_Enable signal. When the processor 103 detects this signal, the processor 103 asserts a New_BAR signal which indicates that a BAR reconfiguration is in progress.

As the host system 101 may send packets immediately after it has finished reconfiguring the BARs 104 in the memory 102, the processor 103 marks the existing PCIe packets in the memory 102 as "old", in the process element 205, as the host system 101 changes the BARs 104, in the process element 206. The packets received after the BAR change are labeled by the processor 103 as being "new", in the process element 207.

Then, the processor 103 processes the old packets in the memory 102 based on their addresses 107 in the address space 108, in the process element 208. For example, the processor 103 processes all of the old packets in the order they are received or based on some other priority before any of the newer received packets are processed. The processor 103 looks for the mark on the packets to determine whether the PCIe packets being processed are old or new, in the process element 209. Accordingly, if only old packets remain in the memory 102, the processor 103 continues processing them (process element 208) until they are all gone. Once all of the old PCIe packets have been processed, the processor 103 remaps the BARs 104 to the addresses 107 of the address space 108, in the process element 210, and then returns to processing the PCIe packets from the newly configured BARs 104 and mappings of the addresses 107, in the process element 203.

It should be noted that the marks of "old" and "new" are merely intended to assist the reader in understanding the processing of the PCIe packets received by the PCIe device 100. The invention is not intended to be limited to actually marking packets as "old" and "new". Rather, any type of flagging may be used to indicate which packets are old or new.

Figure 3:
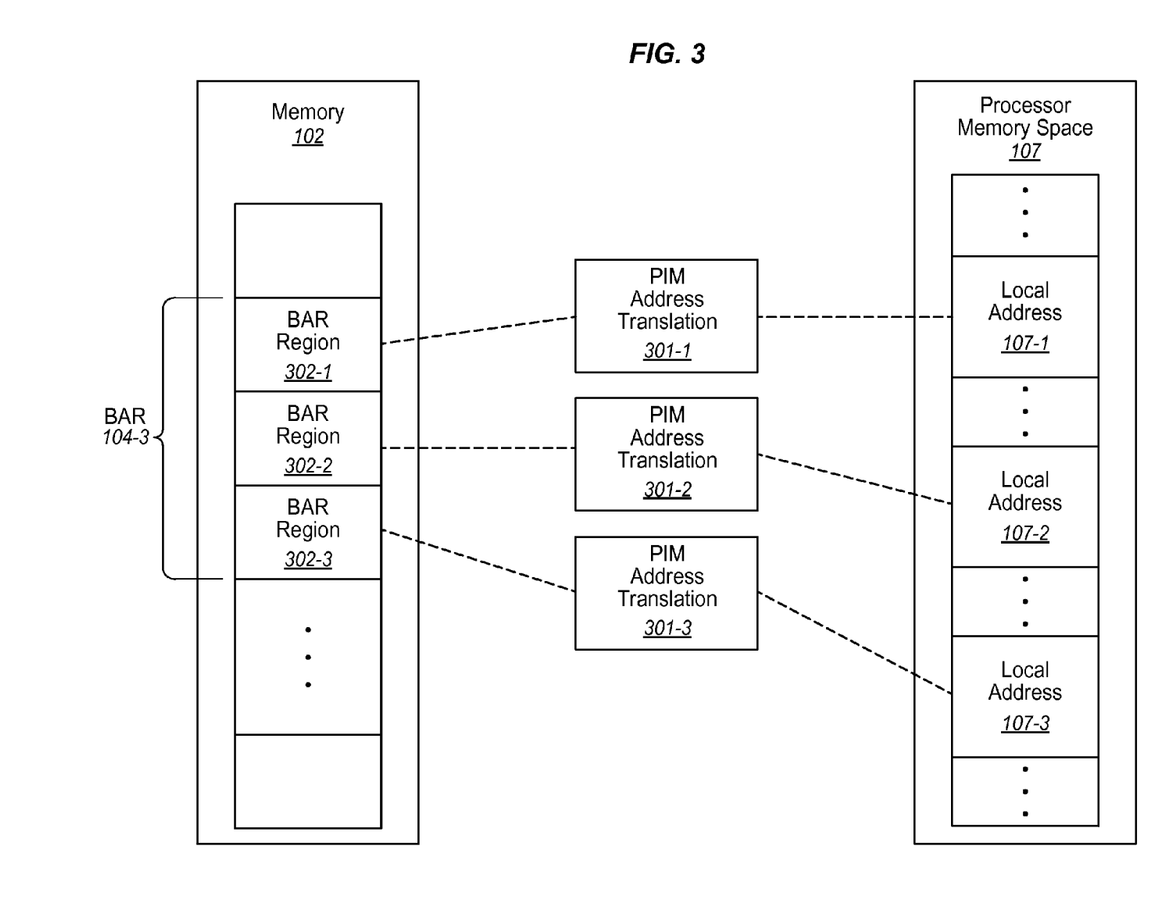
FIG. 3 is a block diagram of an exemplary memory mapping of the PCIe device of FIG. 1.

FIG. 3 is a block diagram of an exemplary memory mapping of the PCIe device 100 of FIG. 1. In this example, the host system 101 configured the memory 102 of the PCIe device 100 with a plurality of BARs 104. And, the processor 103 has configured the address space 108 with a plurality of local addresses 107, with each address being associated with some amount of storage space on the processor 103 (e.g., cache storage). The BARs 104 may be configured with regions of storage space within the memory 102 that are mapped to individual local addresses 107 within the address space 108.

To illustrate, the BAR 104-3 is divided into three regions 302-1-302-3. The BAR region 302-1 is mapped to the local address space 107-1 of the address space 108 through a Packet Inbound Memory (PIM) address translation 301-1. This allows the processor 103 to access inbound packets from the host system 101 stored in the BAR region 302-1 to be quickly accessed via the local address space 107-1 for subsequent routing within the PCIe device 100, to another device, or to a particular application (e.g., an application operable on the PCIe device 100). The BAR region 302-2 is mapped to the local address space 107-2 via the PIM address translation 301-2 and the BAR region 302-3 is mapped to the PIM address translation 301-3 to the local address space 107-3 to operate in similar fashion.

As the PCIe device 100 may be operating on other tasks, a packet inbound from the host system 101 is placed in one of the BAR regions 302 until it can be processed by the processor 103. However, the host system 101 may require changes to the BAR 104 configurations in the memory 102 of the PCIe device 100 as mentioned above. But, the packets residing in the present BARs 104 of the memory 102 still need to be processed according to their old BAR and PIM values. And the new packets being received after the BAR reconfiguration need to be processed with the new BAR and PIM values. Accordingly, the processor 103 detects when the host system 101 is about to reconfigure the BARs 104 in the memory 102 and deems any packets in the present BAR configuration as being old and any packets received after BAR configuration as being new.

Once the BARs 104 are reconfigured, the old packets are processed by the processor 103 without delay according to their original BAR and PIM values. And, once the old packets have been processed and a new packet under the new BAR configuration has been identified, the new packet is processed according to its new BAR and PIM values. Thus, even though a packet may be queued for processing at the time a BAR value changes, the BAR-based routing decisions have already been made by the processor 103 and stored with the received packet. Additional details regarding the handling of the old and new packets are shown and described in FIGS. 4 and 5

Figure 4:
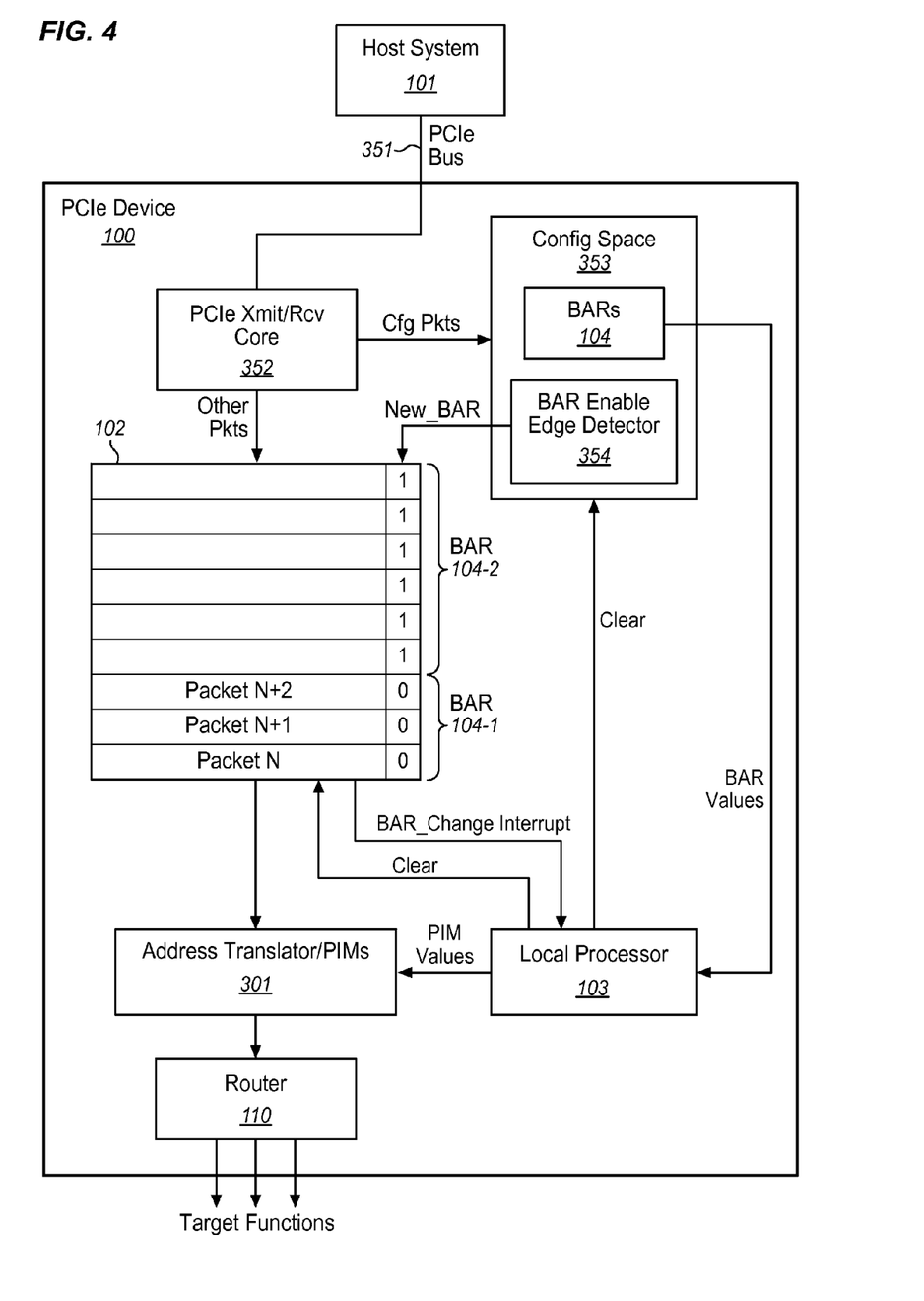
FIG. 4 is a block diagram of another exemplary PCIe device.

FIG. 4 is a block diagram of another exemplary PCIe device 100. This embodiment illustrates additional features of the PCIe device 100 that may be used to clarify the concepts disclosed herein. In this embodiment, the PCIe device includes a PCIe transmit/receive core 352 that is operable to initiate processing of packets received by the host system 101 through a PCIe bus 351. The PCIe transmit/receive core 352 receives configuration packets from the host system 101 that are used to configure the BARs 104 in the memory 102. A configuration space 353 processes those configuration packets to instantiate the BARs 104 within the memory 102. In this example, the memory 102 is illustrated with two BARs 104-1 and 104-2 for the purposes of simplicity. Once the BARs are configured, the PCIe transmit/receive core 352 directs packets to their respective BARs in the memory 102.

The configuration space 353 is also configured with a BAR enable edge detector 354 that is operable to monitor a falling edge of the BAR_Enable signal and assert a New_Bar signal that indicates a reconfiguration is in progress. Thus, any new packets received by the PCIe transmit/receive core 352 are marked by the BAR enable edge detector 354 as being "new" via a logical "1", as illustrated with BAR 104-2. And, the new BAR values are stored with the newly received packet. The old packets labeled logical "0" in the BAR 104-1 are processed by the transmit/receive core 352 without delay according to their previous BAR values.

After the BAR change, the local processor 103 remaps the PIMs 301 and translator addresses according to the address space 108. However, the processor 103 waits to remap the PIMs 301 until the old packets from each BAR 104 have been processed by the PCIe transmit/receive core 352. And, since the PIMs are not changed until then, all address translations are valid with respect to the local address space 108.

When only packets marked as being new remain or if the received queue (i.e., the memory 102) is empty, a safe point is reached such that the local processor 103 can be interrupted to change the PIM values. The PCIe transmit/receive core 352 also waits for a BAR_Enable signal from the host system 101 to go logical "high" before generating the interrupt, the BAR_Enable signal indicating that the BAR reconfiguration is complete.

Thereafter, the PCIe transmit/receive core 352 sends a BAR_Change interrupt to the local processor 103 to direct the local processor 103 to change the PIM values. In this regard, local processor 103 interrogates the new BAR values and changes the PIM values accordingly (i.e., in the address translator/PIMS 301). Once the local processor 13 has finished establishing the new PIM values, it clears the BAR change interrupt. Once the PCIe transmit/receive core 302 detects a falling edge of the BAR change interrupt, the PCIe transmit/receive core 352 clears the new BAR indication from all entries in the queue (i.e., in the memory 102). This unblocks the queue and allows the PCIe transmit/receive core 352 to continue received packet processing according to the PCIe protocol.

Figure 5:
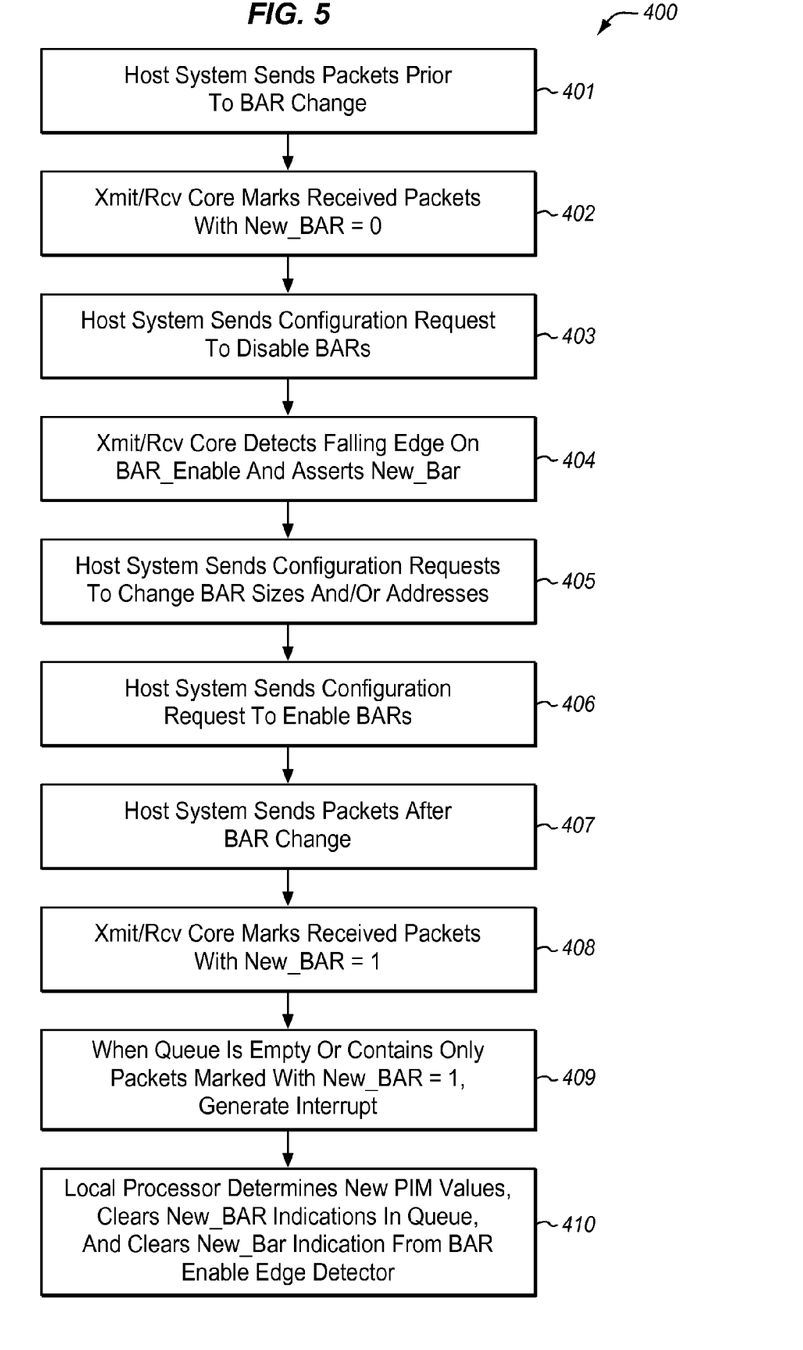
FIG. 5 is a flowchart an exemplary process of the PCIe device of FIG. 4.

The falling edge detection on the BAR change interrupt may be particularly useful as it operates as a delay between the time the PCIe transmit/receive core 352 requests the interrupt to be asserted and the time the corresponding interrupt status bit actually gets asserted. Falling edge detection ensures that the interrupt status bit has indeed been asserted and that the PCIe transmit/receive core 352 will respond only after the assertion. FIG. 5 is a flowchart of one exemplary process 100 of the PCIe device of FIG. 4 illustrating the aforementioned steps in the process elements 401-410.

Figure 6:
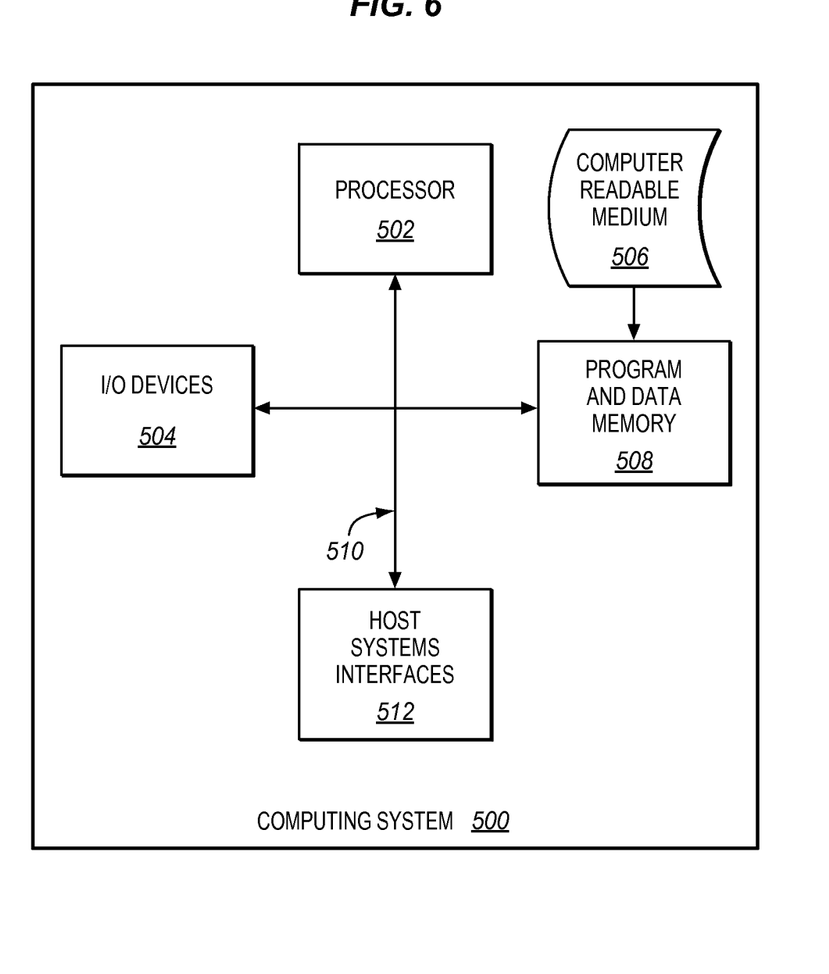
FIG. 6 illustrates an exemplary computer system operable to execute programmed instructions to perform desired functions.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 8 illustrates a computing system 500 in which a computer readable medium 506 may provide instructions for performing any of the methods disclosed herein.

Furthermore, the invention can take the form of a computer program product accessible from the computer readable medium 506 providing program code for use by or in connection with a computer or any instruction execution system. For the purposes of this description, the computer readable medium 506 can be any apparatus that can tangibly store the program for use by or in connection with the instruction execution system, apparatus, or device, including the computer system 500.

The medium 506 can be any tangible electronic, magnetic, optical, electromagnetic, infrared, or semiconductor system (or apparatus or device). Examples of a computer readable medium 506 include a semiconductor or solid state memory, magnetic tape, a removable computer diskette, a random access memory (RAM), a read-only memory (ROM), a rigid magnetic disk and an optical disk. Some examples of optical disks include compact disk—read only memory (CD-ROM), compact disk—read/write (CD-R/W) and DVD.

The computing system 500, suitable for storing and/or executing program code, can include one or more processors 502 coupled directly or indirectly to memory 508 through a system bus 510. The memory 508 can include local memory employed during actual execution of the program code, bulk storage, and cache memories which provide temporary storage of at least some program code in order to reduce the number of times code is retrieved from bulk storage during execution. Input/output or I/O devices 504 (including but not limited to keyboards, displays, pointing devices, etc.) can be coupled to the system either directly or through intervening I/O controllers. Network adapters may also be coupled to the system to enable the computing system 500 to become coupled to other data processing systems, such as through host systems interfaces 512, or remote printers or storage devices through intervening private or public networks. Modems, cable modem and Ethernet cards are just a few of the currently available types of network adapters.

What is claimed is:

1. A Peripheral Component Interconnect Express (PCIe) device operable to couple to a host system, comprising:
   computer memory configured with a plurality of Base Address Registers (BARs) defined by the host system; and
   a processor communicatively coupled to the computer memory and comprising an address space,
   wherein the processor is operable to map addresses of the address space to the BARs for routing PCIe packets from the host system, to determine that the host system is reconfiguring the BARs in the computer memory, and
   based on the determination, to mark PCIe packets existing in the computer memory as old, to change the BARs by reallocating the computer memory as directed by the host system, to mark PCIe packets received after the BARs change as new, to process the old PCIe packets from the computer memory based on their addresses of the address space until a new PCIe packet is reached, and to remap the BARs to the addresses of the address space after the new PCIe packet is reached.

2. The PCIe device of claim 1, further comprising:
a transmit/receive core operable to generate an interrupt request to the processor that directs the processor to change Packet Inbound Memory (PIM) allocations between the BARs and the addresses of the address space.

3. The PCIe device of claim 2, wherein:
the processor is further operable to clear the interrupt request after the PIM allocations are reconfigured.

4. The PCIe device of claim 3, wherein:
the transmit/receive core is further operable to remove the mark of the new PCIe packets based on the cleared interrupt request to resume PCIe packet processing.

5. A method operable in a Peripheral Component Interconnect Express (PCIe) device communicatively coupled to a host system, the method comprising:
configuring a computer memory with a plurality of Base Address Registers (BARs) when instructed by the host system;
mapping addresses of a processor of the PCIe device to the BARs for routing PCIe packets from the host system;
processing PCIe packets from the BARs through the addresses of the processor;
determining that the host system is reconfiguring the BARs in the computer memory; and
based on the determination:
marking PCIe packets existing in the computer memory as old;
changing the BARs in the computer memory by reallocating the computer memory as directed by the host system;
marking PCIe packets received after the BARs reconfiguration as new;
processing the old PCIe packets from the computer memory based on their addresses of the address space until a new PCIe packet is reached; and
remapping the BARs to the addresses of the address space after the new PCIe packet is reached.

6. The method of claim 5, further comprising:
generating an interrupt request to the processor that directs the processor to change Packet Inbound Memory (PIM) allocations between the BARs and the addresses of the address space.

7. The method of claim 6, further comprising:
clearing the interrupt request after the PIM allocations are reconfigured.

8. The method of claim 7, further comprising:
removing the mark of the new PCIe packets based on the cleared interrupt request to resume PCIe packet processing.

9. A non-transitory computer readable medium comprising instructions that, when executed by a processor on a Peripheral Component Interconnect Express (PCIe) device, direct the processor to:
map addresses of a processor of the PCIe device to Base Address Registers (BARs) of a computer memory of the PCIe device for routing PCIe packets from the host system;
process the PCIe packets from the BARs through the addresses of the processor;
determine that the host system is reconfiguring the BARs in the computer memory; and
based on the determination:
mark PCIe packets existing in the computer memory as old;
change the BARs in the computer memory by reallocating the computer memory as directed by the host system;
mark PCIe packets received after the BARs reconfiguration as new;
process the old PCIe packets from the computer memory based on their addresses of the address space until a new PCIe packet is reached; and
remap the BARs to the addresses of the address space after the new PCIe packet is reached.

10. The computer readable medium of claim 9, further comprising instructions that direct the processor to:
generate an interrupt request to change Packet Inbound Memory (PIM) allocations between the BARs and the addresses of the address space.

11. The computer readable medium of claim 10, further comprising instructions that direct the processor to:
clear the interrupt request after the PIM allocations are reconfigured.

12. The computer readable medium of claim 11, further comprising instructions that direct the processor to:
remove the mark of the new PCIe packets based on the cleared interrupt request to resume PCIe packet processing.

13. A Peripheral Component Interconnect Express (PCIe) device, comprising:
a computer memory operable as a queue for packets from a host system;
a packet transmit/receive core communicatively coupled to the computer memory and operable to direct the packets from the host system to the queue and to configure registers in the queue; and
a local processor communicatively coupled to the computer memory and comprising an address space, wherein the local processor is operable to map registers of the queue to addresses of the address space to route packets from the computer memory,
wherein the local processor is further operable to detect a change by the host system to the registers of the queue, to maintain mappings between the registers of the computer memory and the addresses of the address space, to flag packets received after the register change as new, to process packets received before the register change according to the maintained mappings, to change the mappings between the registers of the computer memory and the addresses of the address space when no other packets received before the register change remain, and to process the new packets according to the change between the registers of the computer memory and the addresses of the address space.

14. The PCIe device of claim 13, wherein:
the packet transmit/receive core is further operable to generate an interrupt request to the processor that directs the processor to change Packet Inbound Memory (PIM) allocations between the registers and the addresses of the address space.

15. The PCIe device of claim 14, wherein:
the local processor is further operable to clear the interrupt request after the PIM allocations are reconfigured.

16. The PCIe device of claim 15, wherein:
the packet transmit/receive core is further operable clear to the mark of the new packets based on the cleared interrupt request to resume packet processing.

17. A method operable with a Peripheral Component Interconnect Express (PCIe) device, comprising:
configuring registers in a queue of the PCIe device;
queuing packets from a host system;
mapping the registers of the queue to addresses of the address space to route packets from computer memory,
detecting a change by the host system to the registers of the queue;
maintaining mappings between the registers of the computer memory and the addresses of the address space;
flagging packets received after the register change as new;
processing packets received before the register change according to the maintained mappings;
changing the mappings between the registers of the computer memory and the addresses of the address space when no other packets received before the register change remain; and
processing the new packets according to the change between the registers of the computer memory and the addresses of the address space.

18. The method of claim 17, further comprising:
generating an interrupt request that directs a local processor to change Packet Inbound Memory (PIM) allocations between the registers and the addresses of the address space.

19. The method of claim 18, further comprising:
clearing the interrupt request after the PIM allocations are reconfigured.

20. The method of claim 19, further comprising:
removing flags of the new packets based on the cleared interrupt request to resume packet processing.

* * * * *